United States Patent [19]

Busken et al.

[11] Patent Number: 5,040,811
[45] Date of Patent: Aug. 20, 1991

[54] MOLDED PLASTIC UTILITY CART

[76] Inventors: Dennis D. Busken; Elaine L. Busken, both of 905 Oriental, Florissant, Mo. 63031

[21] Appl. No.: 342,109

[22] Filed: Apr. 24, 1989

[51] Int. Cl.⁵ .............................................. B62B 3/00
[52] U.S. Cl. ................................. 280/47.34; 280/79.2
[58] Field of Search ................. 280/79.11, 79.2, 47.34, 280/47.35, 79.5; 220/676, 913, 643, 659; D34/17, 19

[56] References Cited

U.S. PATENT DOCUMENTS

| | | | |
|---|---|---|---|
| 504,476 | 9/1893 | Kelley | 280/47.371 |
| 920,827 | 5/1909 | Eshelman | 280/79.2 |
| 1,293,512 | 2/1919 | Moses | 280/79.2 |
| 1,752,687 | 4/1930 | Newhouser | 280/79.2 |
| 2,037,291 | 4/1935 | Waldmann | 280/79.2 |
| 2,676,729 | 4/1954 | Neville | 280/79.2 |
| 3,005,572 | 10/1961 | Gustafson et al. | 220/659 |
| 3,162,462 | 12/1964 | Elders | 280/79.2 |
| 3,252,712 | 5/1966 | Klemm | 280/79.2 |
| 3,318,612 | 5/1967 | Kuhn | 280/79.2 |
| 4,597,503 | 7/1986 | Lates | 220/676 |

FOREIGN PATENT DOCUMENTS 0580711 8/1959 Canada ............................. 280/79.2

*Primary Examiner*—Andres Kashnikow
*Assistant Examiner*—Richard Camby
*Attorney, Agent, or Firm*—David L. Baker; Lewis E. Massie

[57] ABSTRACT

A molded multipurpose utility cart with wheels large enough to transfer uneven or rough surfaces. The cart having a handle high enough for operator manipulation of the cart with one hand without bending of the torso. Two supports on the front and back of the cart permit the towing of one or a series of carts in tandem. The carts fabricated of molded plastic of sufficient strength and rigidity to serve as laundry carts, rubbish carts, and material handling carts.

3 Claims, 1 Drawing Sheet

MOLDED PLASTIC UTILITY CART

BACKGROUND OF THE INVENTION

1. Field of the Invention

The present invention relates to utility carts for use as laundry carts, shopping carts and multipurpose carts. The carts are generally made of a box-like receptacle construction supported by castored wheels vehicles on the bottom surface for mobility.

2. Description of the Prior Art

Laundry carts supported on wheels are old in the prior art. U.S. Pat. No. 920,847 Eshelman issued in 1909 describes an iron frame containing a receptacle mounted or castor-supported wheels. A similar device molded of reinforced laminated material is disclosed in U.S. Pat. No. 2,676,729 issued in 1954 to Nelville Jr., et al.

SUMMARY OF THE INVENTION

The utility cart disclosed in the present invention is intended to fill the need of a multipurpose cart that is adaptable for use as a shopping cart, a material handling cart, a gardening cart, a trash cart or as a laundry cart. The height and configuration of the cart handle eliminates back bending operation of the cart. The oversize wheels permit operating the cart over uneven surfaces. A towing support on the lower front and back central surfaces allows the pulling of the cart by a rope, or the like, or attaching one or more carts in tandem. The cart is economically constructed by molding the entire assembly.

DETAILED DESCRIPTION OF THE PREFERRED EMBODIMENTS

Figures 1, 2, 3:
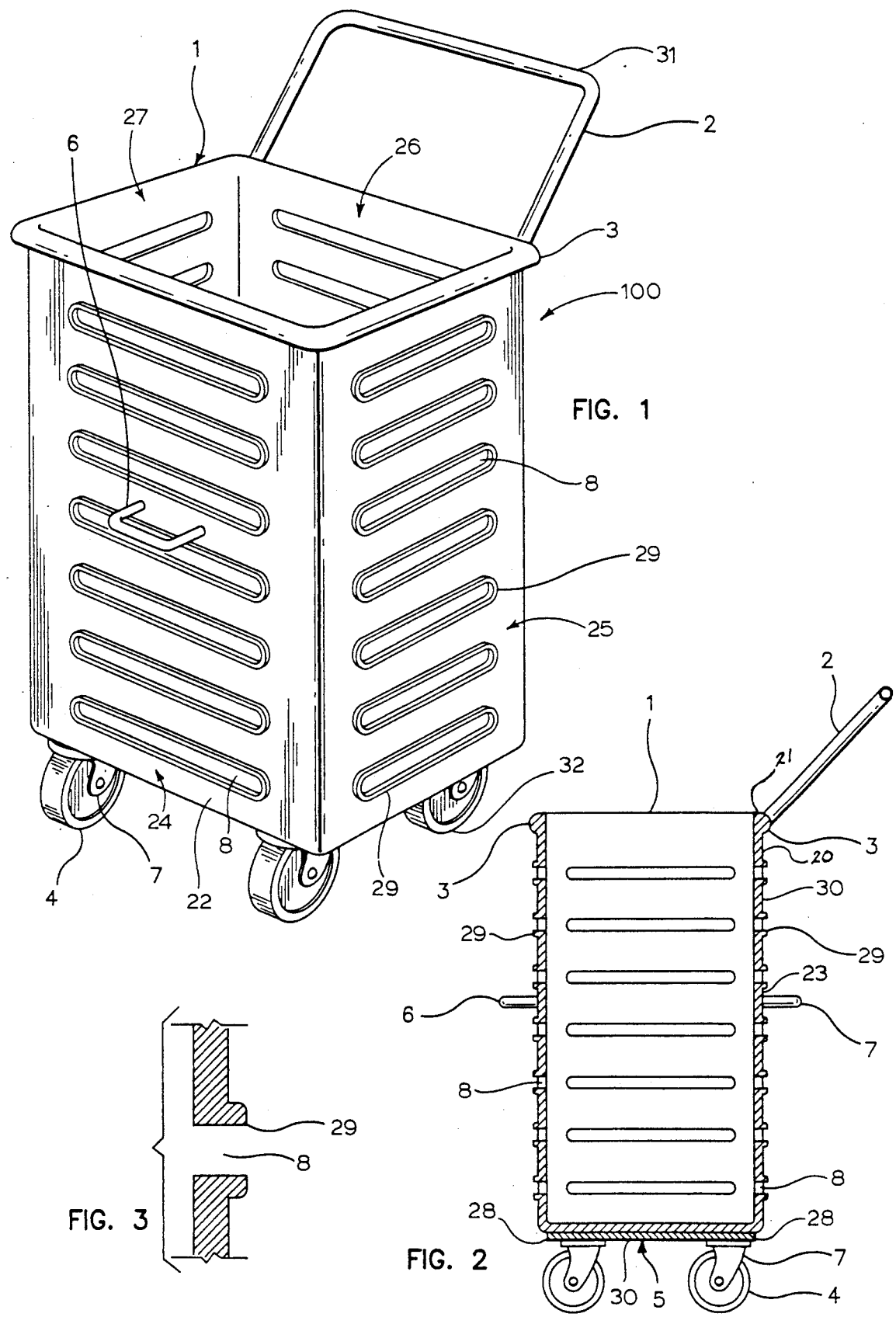
FIG. 1 is a top, front, side perpendicular view of the multipurpose cart.
FIG. 2 is a side sectional view of the multipurpose cart.
FIG. 3 is a detailed cross sectional view of the horizontal slots.

The molded box like cart uses a molded elliptical top rail 3 to support the handle 2. The flat sides of the cart having horizontal slots 8 with molded edges providing additional stiffness. Reinforced handles 3 affixed to the front and back sides of the cart offer provisions for towing a single cart or a train of carts. The castor 7 supported large wheels 4 allow the cart to transverse uneven on rough surfaces. The height of the handle 2 allows single handed control of the cart without the operator bending over a tow rope coupled to the front tow support 6 also provides for towing the cart without the operator bending. A reinforcing plate 5 of wood or metal distributes the cart load to the wheel support assemblies.

A multipurpose utility cart 100 is described herein. The cart 100 has a receptacle 1 molded of a plastic material. The receptacle 1 has a transverse top handle 2 extending upwardly from the top 21 of a rear surface 20 of the receptacle 1.

The top edge 3 of the receptacle is molded into an elliptical cross section for increased support for the handle 2. There is a first tow handle 6 affixed to a lower, front, central portion 22 of the receptacle and a second tow handle 7 affixed to a lower, back central portion 23 of the receptacle. The four sides 24, 25, 26 and 27 of the receptacle 1 have a plurality of horizontal slotted openings 8.

The horizontal edges 29 of the horizontal slotted openings 8 are molded outwards to provide stiffness to the sides of the receptacle. The receptacle has a reinforcing plate 5 on the bottom of the receptacle 1 for added support and for attaching a plurality of wheel mountings (not shown). There are four rotatable wheel castors 7 mounted on corners 28, of the bottom 30 of the receptacle via the wheel mountings. A plurality of rubber-tired wheels 4, exceeding five inches in diameter, are mounted in the wheel support castors 7. The top 31 of a transverse top handle 2 ranges in height from three to four feet high measured from the bottom 32 of the wheels 4.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

We claim:

1. A multipurpose utility cart comprising:
   a. a receptacle molded of a plastic material;
   b. the receptacle having a transverse top handle extending upwardly from a rear top edge of the receptacle;
   c. said rear top edge of the receptacle is molded into an elliptical cross section for increased support for the handle;
   d. a first tow handle affixed to a lower, front, central portion of the receptacle;
   e. a second tow handle affixed to a lower, back central portion of the receptacle;
   f. four sides of the receptacle having a plurality of horizontal slotted openings;
   g. horizontal edges of the horizontal slotted openings being molded outwards to provide stiffness to the sides of the receptacle;
   h. the receptacle has a reinforcing plate on a bottom of the receptacle for added support and for attaching a plurality of wheel mountings;
   i. four rotatable wheel support castors, mounted on corners of the bottom of the plate;
   j. a plurality of rubber-tired wheels, exceeding five inches in diameter, are mounted in the wheel support castors; and
   k. a top of the transverse top handle ranges in height from three to four feet high measured from the bottom of the wheels.

2. A cart as described in claim 1 wherein the reinforcing plate comprises being made of metal.

3. A cart as described in claim 1 wherein the reinforcing plate comprises being made of wood.

* * * * *